United States Patent
Hata et al.

(10) Patent No.: US 10,640,153 B2
(45) Date of Patent: May 5, 2020

(54) DIFFERENT MATERIALS JOINT STRUCTURE

(71) Applicant: HONDA MOTOR CO., LTD., Tokyo (JP)

(72) Inventors: Tsunehisa Hata, Wako (JP); Kenichi Kawasaki, Wako (JP); Akihiko Asami, Wako (JP); Shosuke Ohhama, Wako (JP); Tomoyuki Imanishi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 109 days.

(21) Appl. No.: 16/155,984

(22) Filed: Oct. 10, 2018

(65) Prior Publication Data

US 2019/0111975 A1  Apr. 18, 2019

(30) Foreign Application Priority Data

Oct. 12, 2017  (JP) ................. 2017-198879

(51) Int. Cl.
| | |
|---|---|
| *B23K 20/00* | (2006.01) |
| *B62D 27/00* | (2006.01) |
| *B62D 27/02* | (2006.01) |
| *B62D 29/00* | (2006.01) |
| *B32B 15/01* | (2006.01) |
| *B62D 21/11* | (2006.01) |
| *B23K 103/10* | (2006.01) |
| *B23K 20/12* | (2006.01) |
| *B23K 103/04* | (2006.01) |
| *B23K 103/20* | (2006.01) |

(52) U.S. Cl.
CPC .......... *B62D 27/023* (2013.01); *B32B 15/012* (2013.01); *B62D 21/11* (2013.01); *B62D 29/008* (2013.01); *B23K 20/122* (2013.01); *B23K 2103/04* (2018.08); *B23K 2103/10* (2018.08); *B23K 2103/20* (2018.08)

(58) Field of Classification Search
CPC .............. B23K 20/1265; B23K 20/122; B23K 2103/20; B23K 20/1255
See application file for complete search history.

(56) References Cited

U.S. PATENT DOCUMENTS

| | | | |
|---|---|---|---|
| 9,221,233 B2 * | 12/2015 | Sayama ................ | B32B 15/012 |
| 2013/0249250 A1 * | 9/2013 | Ohhama ................ | B62D 21/11 |
| | | | 296/204 |
| 2014/0217151 A1 | 8/2014 | Miyahara et al. | |
| 2014/0248508 A1 * | 9/2014 | Ohhama ................ | B32B 15/043 |
| | | | 428/638 |

FOREIGN PATENT DOCUMENTS

WO  2013027474 A1  2/2013

* cited by examiner

*Primary Examiner* — Erin B Saad
(74) *Attorney, Agent, or Firm* — Rankin, Hill & Clark LLP

(57) ABSTRACT

A subframe structure includes a frame front part and a frame rear part in a vehicle front-rear direction. The frame front part and the frame rear part are joined together. The frame front part has a higher strength than the frame rear part. The subframe has different strengths from part to part. The frame front part is made of a galvannealed steel plate (GA steel plate) subjected to an electrodeposition coating. The frame rear part is made of a hot-dip galvanized steel plate (GI steel plate) subjected to an electrodeposition coating. A rear cross member of an aluminum die-casting and a rear cross panel of a hot-dip galvanized steel plate (GI steel plate) are integrally joined together by a friction stir welding.

3 Claims, 8 Drawing Sheets

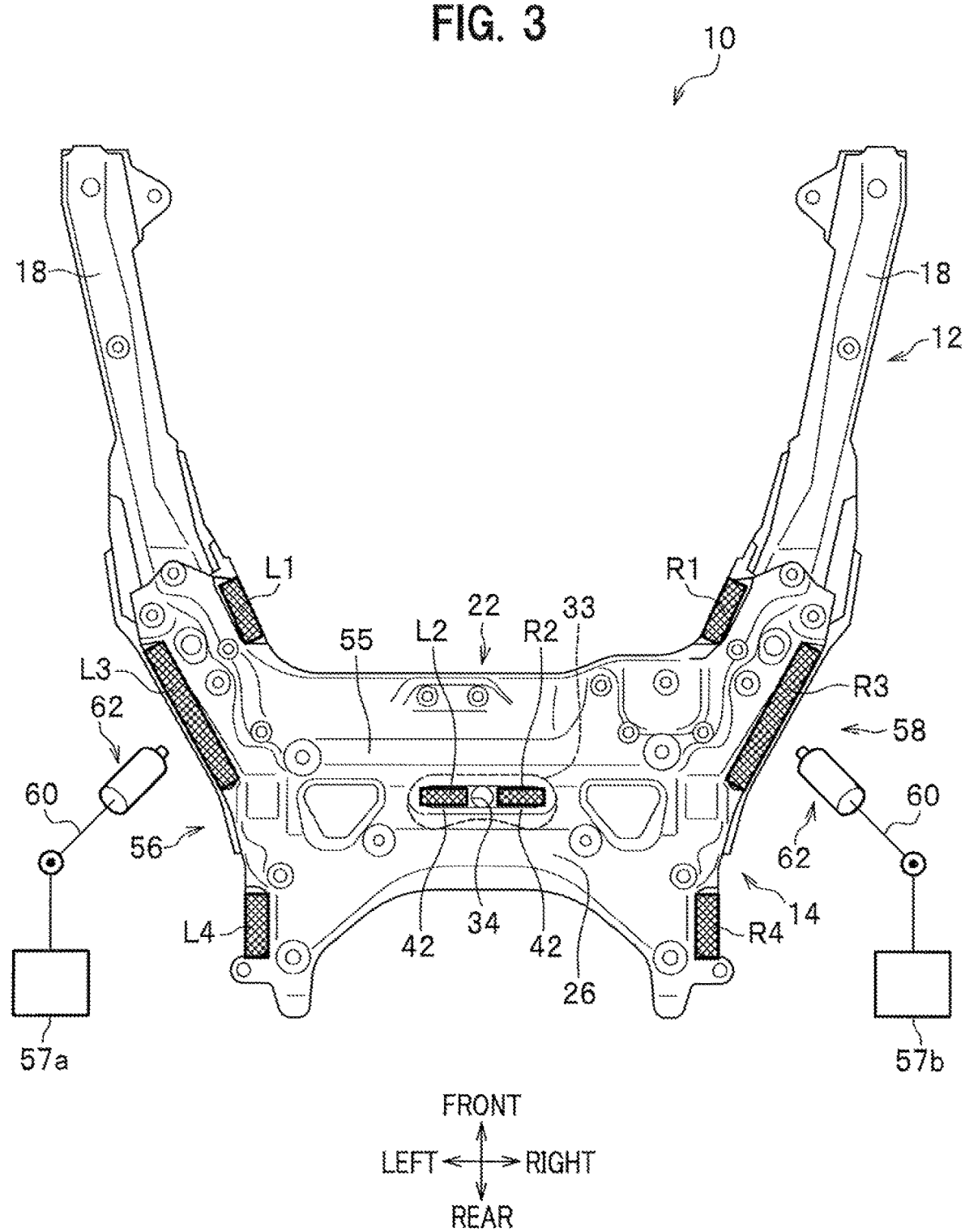

| STEEL PALTE MATERIAL | | STEEL TYPE STRENGTH CLASS (MPa) | SURFACE PLATING LAYER THICKNESS (μm) | PLATING LAYER | | |
|---|---|---|---|---|---|---|
| | | | | ALLOY FORM | HARDNESS (Hv) | MELTING POINT (°C) |
| PRESENT EMBODIMENT | GI STEEL PLATE | 270 | 8~12 | η Fe-Zn | 52 | 420 |
| COMPARATIVE EXAMPLE | GA STEEL PLATE | 270 | 5~8 | ζ Fe-Zn | 200 | 530 |
| | | | | σ Fe-Zn | 284-300 | 665 |
| | | | | γ Fe-Zn | 326 | 782 |

DIFFERENT MATERIALS JOINT STRUCTURE

CROSS-REFERENCE TO RELATED APPLICATIONS

This application is based upon and claims the benefit of priority from Japanese Patent Application No. 2017-198897 filed on Oct. 12, 2017; the entire contents of which are incorporated herein by reference.

BACKGROUND OF THE INVENTION

1. Field of the Invention

The present invention relates to a different materials joint structure which is formed by friction stir welding of different materials, an iron member and an aluminum member.

2. Description of the Related Art

For example, International Publication No. WO2013/027474 (Patent Document 1) discloses a friction stir welding tool including a probe and a holder. The friction stir welding method refers to a welding method in which the pin portion at the distal end of the probe is rotated at a high speed, the materials to be joined are allowed to plastically flow due to the frictional heat generated between the pin portion and the materials to be joined, and the materials to be joined are joined integrally.

This friction stir welding requires a tool which includes a probe having a pin portion and a holder holding this probe. In addition, since the replacement frequency for replacing the exhausted probe by a new probe is high, it is preferable to easily perform the operation of replacing the probe from the holder.

In addition to the above, Patent Document 1 discloses a technical idea capable of easily replacing the probe and the holder thanks to the improved structures of the probe and the holder.

However, Patent Document 1 does not disclose or suggest anything concerning, for example, reduction of the frequency of replacing the probe, demand to enhance the strength of the portion of the iron member, and the materials to be joined for improving the friction stir welding property.

SUMMARY OF THE INVENTION

The present invention is directed to a different materials joint structure which achieves both a high strength characteristic and the reduction of joining cost (faster friction stir welding and reduction of defective joint rate) in consideration of the strength characteristic and the jointability of a portion of the iron member to be joined by friction stir welding to a portion requiring a high strength characteristic.

An aspect of the present invention is a different materials joint structure which includes different materials of an iron member and an aluminum member integrally joined together by a friction stir welding. The different materials joint structure is a subframe mounted on a vehicle. The subframe includes a frame front part and a frame rear part in a vehicle front-rear direction. The frame front part and the frame rear part are joined together. The frame front part has a higher strength than the frame rear part. The subframe has different strengths from part to part, and surface treatment of the iron member differs between the frame front part and the frame rear part.

In the present invention, it is possible to obtain a different materials joint structure which achieves all of a reduced weight and a high strength characteristic, a faster friction stir welding rate, and the improvement of corrosion resistance reliability, as compared with the conventional techniques.

BRIEF DESCRIPTION OF THE DRAWINGS

FIG. 3 is a plan view of the subframe structure, illustrating friction stir welding portions;

DETAILED DESCRIPTION OF THE EMBODIMENTS

Next, an embodiment of the present invention will be described in detail with reference to the drawings as appropriate. In each of the figures, "front and rear" indicates a vehicle front-rear direction (longitudinal direction), "right and left" indicates a vehicle width direction (right-and-left direction or transverse direction), and "upper and lower" indicates a vehicle upper-and-lower direction (vertical upper-and-lower direction or vertical direction).

Figure 1:
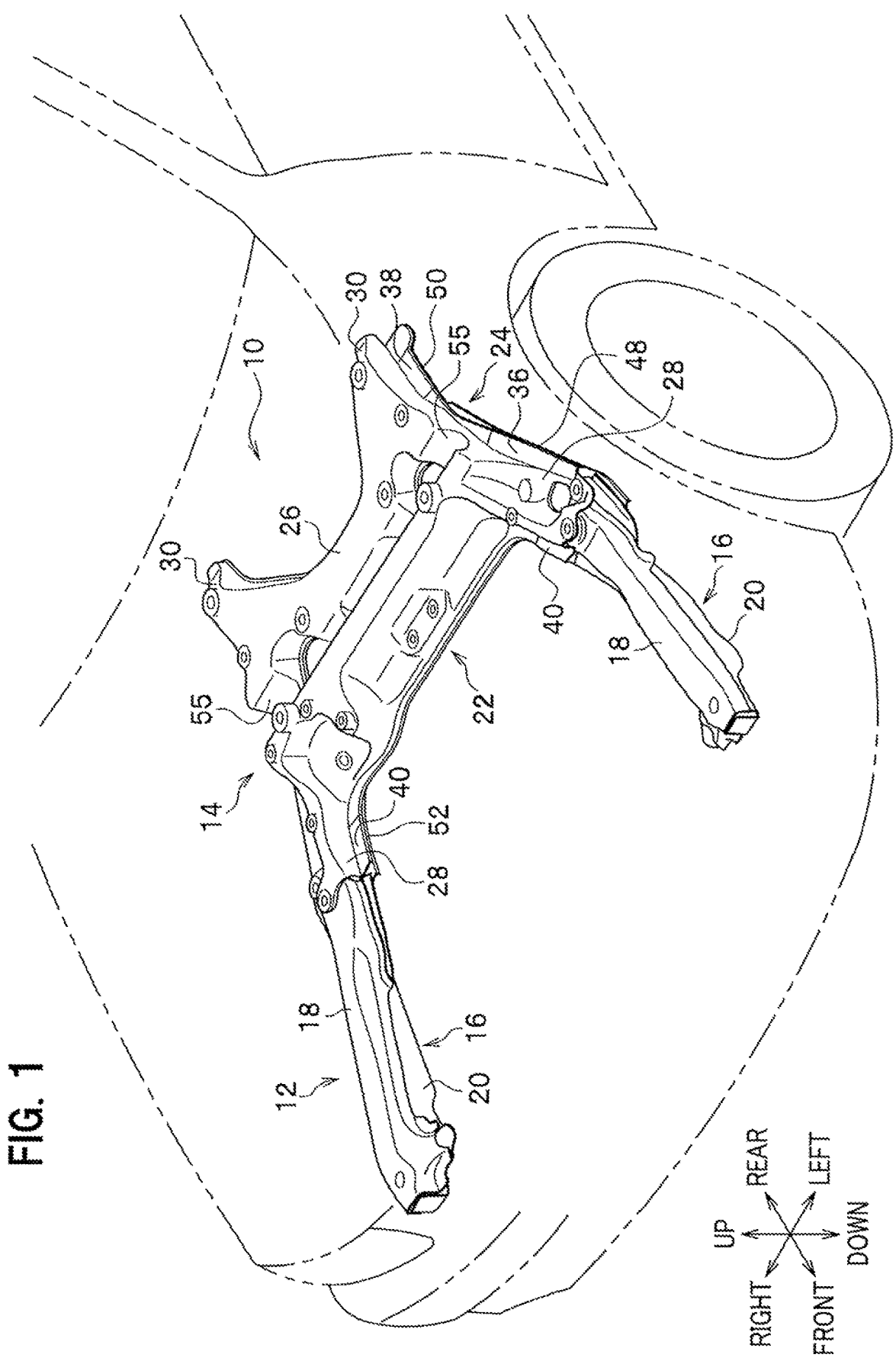
FIG. 1 is a schematic perspective view illustrating a state where a subframe structure according to an embodiment of the present invention is incorporated in a front part of an automobile.

As illustrated in FIG. 1, a subframe structure (subframe, different materials joint structure) 10 according to the embodiment of the present invention is disposed in a vehicle body front part, and is provided to be fixed to a not-illustrated vehicle body member (frame member) or provided to be floatably supported by a not-illustrated floating mechanism. When the subframe structure 10 is supported by a not-illustrated floating mechanism, there is an advantage that vibration transmitted from the vehicle body can be favorably absorbed.

Figure 2:
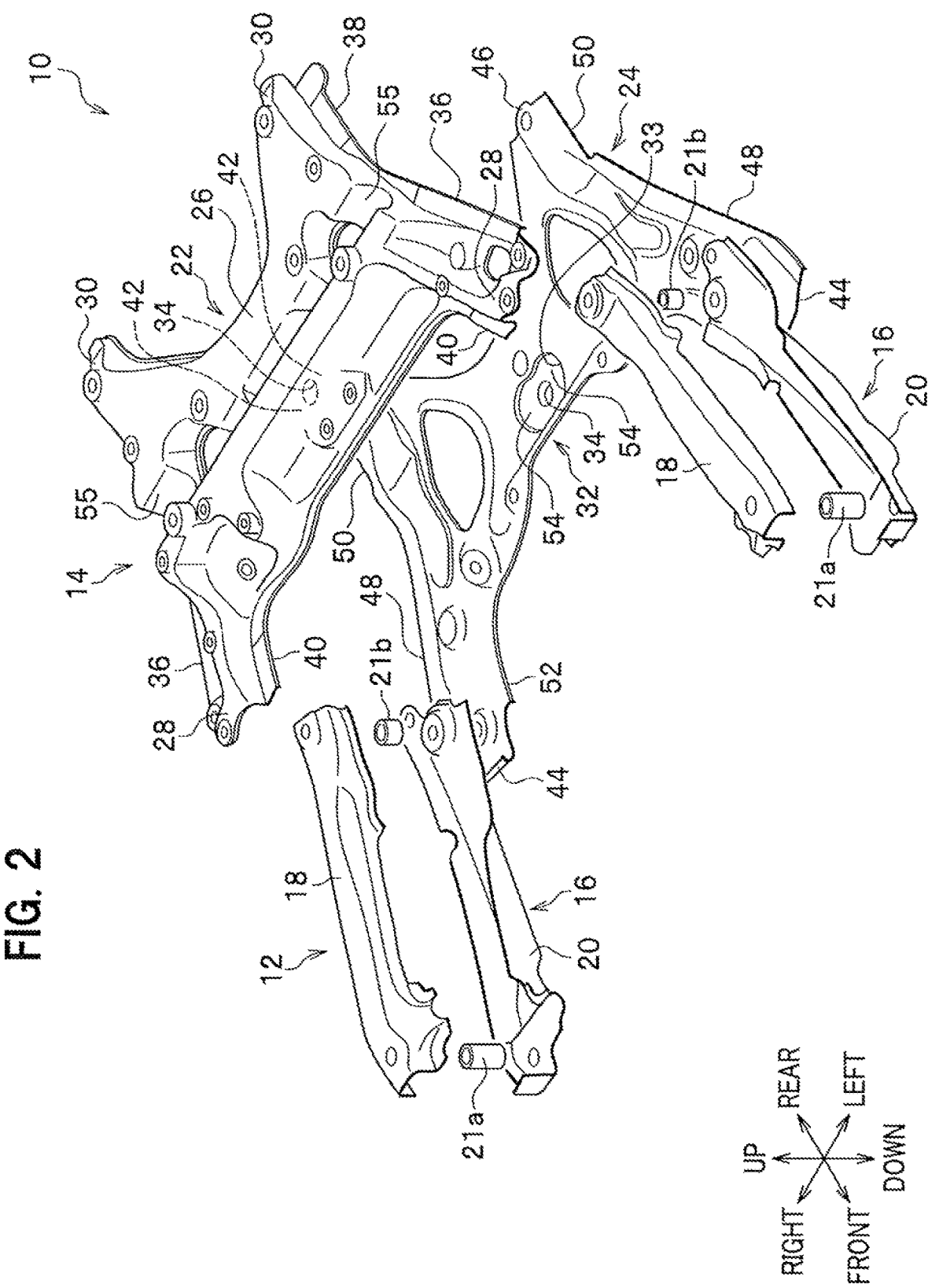
FIG. 2 is an exploded perspective view of the subframe structure illustrated in FIG. 1.

As illustrated in FIG. 1 to FIG. 3, the subframe structure 10 is made up of frame front parts 12 and a frame rear part 14 divided into two in a vehicle front-rear direction. Each of the frame front parts 12 is a steel hollow body of a V shape in a plan view from the vehicle rear side. The frame rear part 14 is a light metal hollow body having a substantially U shape in a plan view. The frame front part 12 has a higher strength than the frame rear part 14, and in the present embodiment, the strength of the subframe structure 10 is partially changed. The surface treatment of the steel plate (plating layer) differs between the frame front part 12 and the frame rear part 14. This point will be described in detail later.

The frame front part 12 is, for example, a press molded body formed by press-molding a steel plate material. The frame rear part 14 (rear cross member 22 to be described later) is an aluminum die-cast molded body formed by die casting for solidifying molten aluminum or aluminum alloy in a cavity of, for example, a not-illustrated mold (die casting machine).

The frame front parts 12 are disposed on both sides in the vehicle width direction and include a pair of right and left front side members 16 and 16 extending in the vehicle front-rear direction.

Each of the front side members 16 includes an upper side member 18 and a lower side member 20. The upper side member 18 and the lower side member 20 are each formed of a galvannealed steel plate (GA steel plate).

In each front side member 16, the upper side member 18 on the upper side and the lower side member 20 on the lower side separately pressed are integrally joined together with a hollow body by, for example, arc welding or the like. In each upper side member 18 and the corresponding lower side member 20, the vehicle front end portions and the vehicle rear end portions in the axial direction are integrally fastened with a pair of collar members 21*a* and 21*b* interposed in between. The vertical cross section of each front side member 16 in a direction perpendicular to the axis is a closed cross section of a substantially rectangular shape.

The vehicle rear end portion of the frame front part 12 is integrally joined to a vehicle front end portion (panel connecting portion 44 to be described later) of the frame rear part 14 by welding means such as arc welding.

Note that in the present embodiment, no front cross member is provided for suspending the vehicle front end portions of the front side members 16, and the construction is such that the vehicle front end portions of the front side members 16 are distanced from each other. Note that a so-called latticework structure may be employed in which the vehicle front end portions of the front side members 16 are suspended with a not-illustrated front cross member.

The frame rear part 14 is formed by integrally joining the rear cross member 22 on the upper side and the rear cross panel 24 on the lower side. The rear cross member 22 is, for example, an aluminum (aluminum alloy) die-cast molded body. On the other hand, the rear cross panel 24 is a press molded body formed by pressing a hot-dip galvanized steel plate (GI steel plate). As described later, the rear cross member 22 and the rear cross panel 24 are integrally joined by friction stir welding.

In the rear cross member 22, a rear cross main body portion 26, rear connecting portions 28, and rear protruding portions 30 are integrally formed. The rear cross main body portion 26 is substantially rectangular in a plan view and extends horizontally in the vehicle width direction. The rear connecting portions 28 protrude toward the front of the vehicle from both sides of the rear cross main body portion 26 in the vehicle width direction. The rear protruding portions 30 protrude toward the rear of the vehicle from both the right and left sides of the rear cross main body portion 26 in the vehicle width direction.

A substantially central portion of the rear cross main body portion 26 and a substantially central portion of a panel main body portion 32 to be described later have a circular through hole 34 (see FIG. 3) formed by small diameter hole portions overlapping each other to penetrate in an upper-and-lower direction. This through hole 34 functions as a drain hole.

As illustrated in FIG. 2, a pair of front outer side flange portions 36 and 36 extending substantially in the vehicle front-rear direction are provided on the right and left outer sides of the rear connecting portions 28 in the vehicle width direction and on part of the vehicle front side on the right and left outer sides of the rear cross main body portion 26 in the vehicle width direction. In addition, a pair of rear outer side flange portions 38 and 38 are provided on the right and left outer sides of the rear protruding portions 30 in the vehicle width direction (note that the illustration of the rear outer side flange portion 38 on the right side is omitted). Moreover, a pair of front inner side flange portions 40 and 40 extending substantially in the vehicle front-rear direction are provided on the right and left inner sides of the rear connecting portions 28 in the vehicle width direction.

Furthermore, as illustrated in FIG. 2 and FIG. 3, a substantially elliptical recessed portion 33 is provided in the center of the rear cross main body portion 26. In this recessed portion 33, a pair of center joining portions 42 and 42 are formed on both sides of the vehicle width direction across the through hole 34. In the rear cross member 22, eight flange portions and joining portions in total are arranged at both side portions in the vehicle width direction and the center portion thereof. By providing the pair of center joining portions 42 and 42 with the through hole 34 in between, it is possible to obtain a desired rigidity and strength as a jack-up point.

As illustrated in FIG. 2, the rear cross panel 24 has a shape substantially corresponding to the rear cross member 22 and is integrally formed of the panel main body portion 32, the panel connecting portions 44, and the panel protruding portions 46.

A pair of front outer side flange portions 48 and 48 extending substantially in the vehicle front-rear direction are provided on the right and left outer sides of the panel connecting portions 44 in the vehicle width direction and on a part of the vehicle front side on the right and left outer sides of the panel main body portion 32 in the vehicle width direction. In addition, a pair of rear outer side flange portions 50 and 50 are provided on the right and left outer sides of the panel protruding portions 46 in the vehicle width direction. Moreover, a pair of front inner side flange portions 52 and 52 extending substantially in the vehicle front-rear direction are provided on the right and left inner sides of the panel connecting portions 44 in the vehicle width direction (note that the illustration of the front inner side flange portion 52 on the left side is omitted). Furthermore, in the central portion of the panel main body portion 32, a pair of center joining portions 54 and 54 are formed on both sides of the vehicle width direction across the through hole 34. In the rear cross panel 24, eight flange portions and joining portions in total are arranged at both side portions in the vehicle width direction and the center portion thereof.

The flange portions and the joining portions formed in the rear cross member 22 and the rear cross panel 24 are arranged at such positions that, when the rear cross member 22 and the rear cross panel 24 are placed on each other in the upper-and-lower direction, the flange portions and the joining portions overlap in an upper-and-lower direction. As described later, by friction stir welding the overlapping flange portions and joining portions to each other, the flange portions and the joining portions are integrally joined.

Note that as illustrated in FIG. 2, in the rear cross main body portion 26, recessed portions 55 recessed in a semi-circular cross section for mounting a rack shaft of a not-illustrated steering mechanism is linearly formed in the vehicle width direction.

The shaded areas in FIG. 3 show friction stir welding portions in the frame rear part 14. These friction stir welding portions include a left-side friction stir welding portion 56 and a right-side friction stir welding portion 58 which respectively correspond to a pair of a left-side friction stir welding robot 57a and a right-side friction stir welding robot 57b disposed on both the right and left sides in the vehicle width direction.

Note that the pair of the left-side friction stir welding robot 57a and the right-side friction stir welding robot 57b each have a robot arm 60 which is displaceable in multiple axis directions including the three axes orthogonal to one another (the X axis, the Y axis, and the Z axis), and the robot arm 60 has a distal end connected to the joining tool 62. The joining tool 62 will be described in detail later.

As illustrated in FIG. 3, the left-side friction stir welding portion 56 has four friction stir welding portions which include a left inner side flange joining portion L1, a left center joining portion L2, a left outer side flange front joining portion L3, and a left outer side flange rear joining portion L4.

On the other hand, the right-side friction stir welding portion 58 has four friction stir welding portions which include a right inner side flange joining portion R1, a right center joining portion R2, a right outer side flange front joining portion R3, and a right outer side flange rear joining portion R4.

The right and left inner side flange joining portions R1 and L1 are formed such that the pair of front inner side flange portions 40 and 40 of the rear cross member 22 are placed in the upper-and-lower direction on the pair of front inner side flange portions 52 and 52 of the rear cross panel 24, followed by friction stir welding. In addition, the right and left center joining portions R2 and L2 are formed such that the pair of center joining portions 42 and 42 of the rear cross member 22 are placed in the upper-and-lower direction on the pair of center joining portions 54 and 54 of the rear cross panel 24, followed by friction stir welding.

Moreover, the right and left outer side flange front joining portions R3 and L3 are formed such that the pair of front outer side flange portions 36 and 36 of the rear cross member 22 are placed in the upper-and-lower direction on the pair of front outer side flange portions 48 and 48 of the rear cross panel 24, followed by friction stir welding. Furthermore, the right and left outer side flange rear joining portions R4 and L4 are formed such that the pair of rear outer side flange portions 38 and 38 of the rear cross member 22 are placed in the upper-and-lower direction on the pair of rear outer side flange portions 50 and 50 of the rear cross panel 24, followed by friction stir welding.

The left-side friction stir welding portion 56 is friction stir welded by the control operation of the joining tool 62 of the left-side friction stir welding robot 57a in the order of, for example, the center joining portion L2→ the rear outer side flange joining portion L4→the front inner side flange joining portion L1→ the front outer side flange joining portion L3. On the other hand, the right-side friction stir welding portion 58 is friction stir welded by the control operation of the joining tool 62 of the right-side friction stir welding robot 57b in the order of, for example, the front outer side flange joining portion R3→ the rear outer side flange joining portion R4→ the front inner side flange joining portion R1→ the center joining portion R2.

Figure 6A:
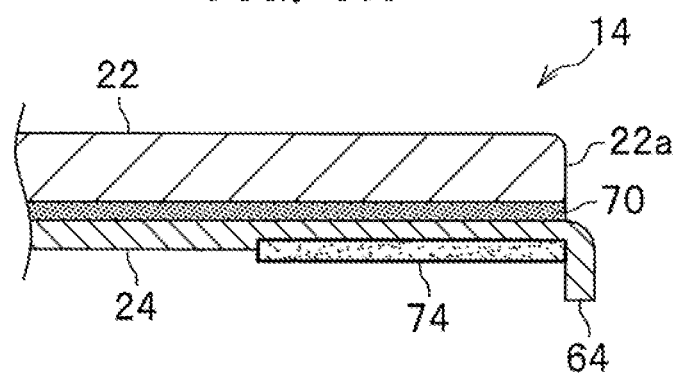
FIG. 6A is a cross-sectional view of the present embodiment provided with a protruding portion at a side end portion of a rear cross panel.

As illustrated in FIG. 6A, both side end portions in the vehicle width direction of the rear cross member 22 forming the frame rear part 14 each have a protruding portion 64. The protruding portions 64 extend outward from both side end portions 22a in the vehicle width direction of the rear cross member 22 forming the frame rear part 14.

The protruding portions 64 are provided on the pair of front outer side flange portions 48 and 48 and on the pair of front inner side flange portions 52 and 52 of the rear cross panel 24. Each of the flange portions of the rear cross panel 24 is formed as a protruding portion 64 having a substantially L-shaped cross section and extending outward in the vehicle width direction from the corresponding flange portion of the rear cross member 22. The operations and effects of these protruding portions 64 will be described in detail later.

The subframe structure 10 according to the present embodiment is basically constructed as described above, and the operations and effects thereof will be described next.

Figure 4A:
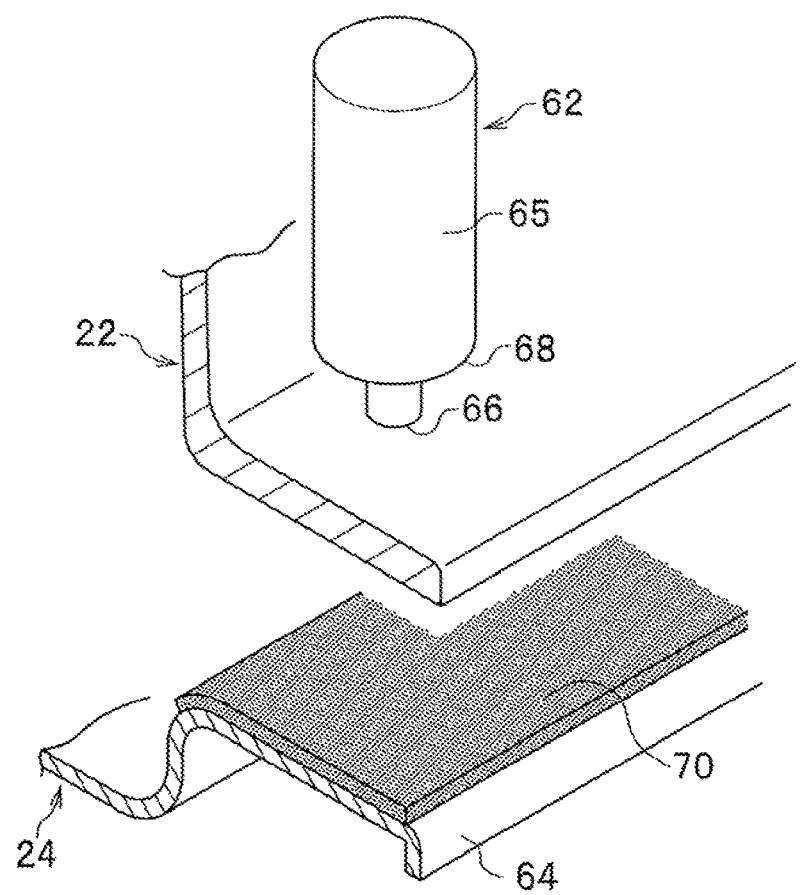
FIG. 4A is a perspective view illustrating friction stir welding by use of a joining tool.
Figure 4B:
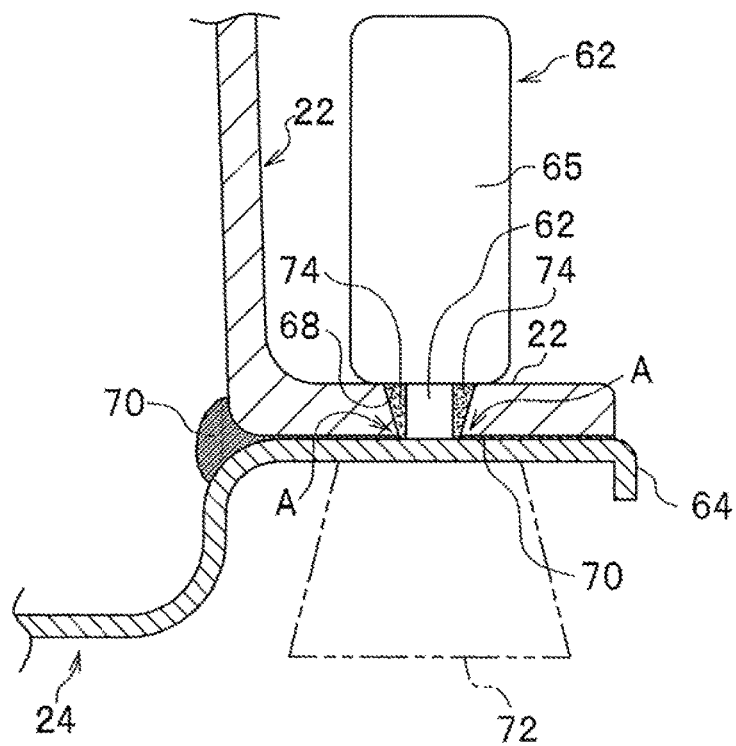
FIG. 4B is a vertical cross-sectional view illustrating a state after friction stir welding.

FIG. 4A is a perspective view illustrating friction stir welding by use of a joining tool, and FIG. 4B is a vertical cross-sectional view illustrating a state after friction stir welding.

First, a description is provided for the step of integrally joining, by friction stir welding, the overlapping portions of the frame rear part 14, i.e., the flange portion of the rear cross member 22 which is an aluminum alloy die-cast molded body and the flange portion of the rear cross panel 24 which is a press molded body formed of an electrodeposition-coated hot-dip galvanized steel plate (GI steel plate). Note that the side end portion in the vehicle width direction of the flange portion of the rear cross panel 24 is provided with the protruding portion 64 having a substantially L-shaped cross section.

As illustrated in FIG. 4A, the joining tool 62 used for friction stir welding has a column-shaped rotor 65 which is rotationally driven around the rotational axis by a rotary drive source such as a not-illustrated motor and a joining pin (probe) 66 protruding in the axial direction from the bottom center of this rotor 65. A shoulder portion 68 is formed by an annular step portion between the joining pin 66 and the rotor 65.

After setting the rear cross panel 24 on the not-illustrated clamp table, a sealing material 70 (for example, an air dry sealing material) is applied to the upper surface of the flange portion of the rear cross panel 24 with a not-illustrated sealing material coating mechanism. After the rear cross member 22 is covered on the upper surface of the rear cross panel 24 coated with the sealing material 70, the rear cross member 22 and the rear cross panel 24 placed in the upper-and-lower direction are clamped using a not-illustrated clamp mechanism.

Subsequently, the above joining tool 62 is lowered from above, and the flange portions of the rear cross member 22 and the rear cross panel 24 are friction stir welded together. Note that a jig 72 for backing up the applied pressure applied to the flange portions by joining tool 62 is provided on the lower side of the flange portions (see FIG. 4B).

The rotor 65 and the joining pin 66 are gradually brought close to the upper surface of the rear cross member 22 while being integrally rotated, and the distal end portion of the joining pin 66 is brought into contact with the upper surface of the rear cross member 22 by the applied pressure (press pressure) for rotation insertion. In this way, a plastic flow region is generated.

Further, the rotor 65 and the joining pin 66 are pressurized to enter the upper surface while being integrally rotated, and the joining pin 66 is inserted vertically downward until the shoulder portion 68 of the rotor 65 comes into slide contact with the upper surface of the rear cross member 22. When the distal end of the joining pin 66 is rotation-inserted until it comes into contact with the upper surface of the rear cross panel 24, the plastic flow region generated in the rear cross member 22 plastically flows and the new steel surface of the rear cross panel 24 is exposed, resulting in solid-phase bonding.

A friction stir welding portion is formed as in the above description, where the robot arm 60 is manipulated to integrally displace the rotor 65 and the joining pin 66 while maintaining the state in which the distal end of the joining pin 66 is in contact with the upper surface of the rear cross panel 24.

Hereinafter, the friction stir welding portion will be described in detail.

FIG. 4B is a cross-sectional view illustrating a state where a rear cross member 22 which is an aluminum alloy member and an electrodeposition-coated hot-dip galvanized steel plate (GI steel plate) 24 are integrated with friction stir welding portions 74 (see dotted regions) in between.

Electrodeposition coating on the surface of the GI steel plate has deteriorated due to e.g. thermal influence of friction stir welding in the non-joined portions A near the friction stir welding portions 74. The non-joined gap is filled with a sealing material 70 and has a structure in which this sealing material 70 makes it possible to prevent ingress (penetration) of water or electrolyte as a corrosion factor. This prevents the occurrence of potential corrosion of the non-joined gap.

In the case of considering the degradation or filling failure of the sealing material 70 or in the case of abolishing the sealing material 70 considering cost reduction, it can be expected to improve the corrosion resistance reliability of the non-joined gap as the effect of the hot-dip galvanized steel plate (GI steel plate) employed in the present embodiment, in addition to the friction stir welding property.

Next, corrosion resistance of the friction stir welding portion will be explained.

Figures 5A, 5B:
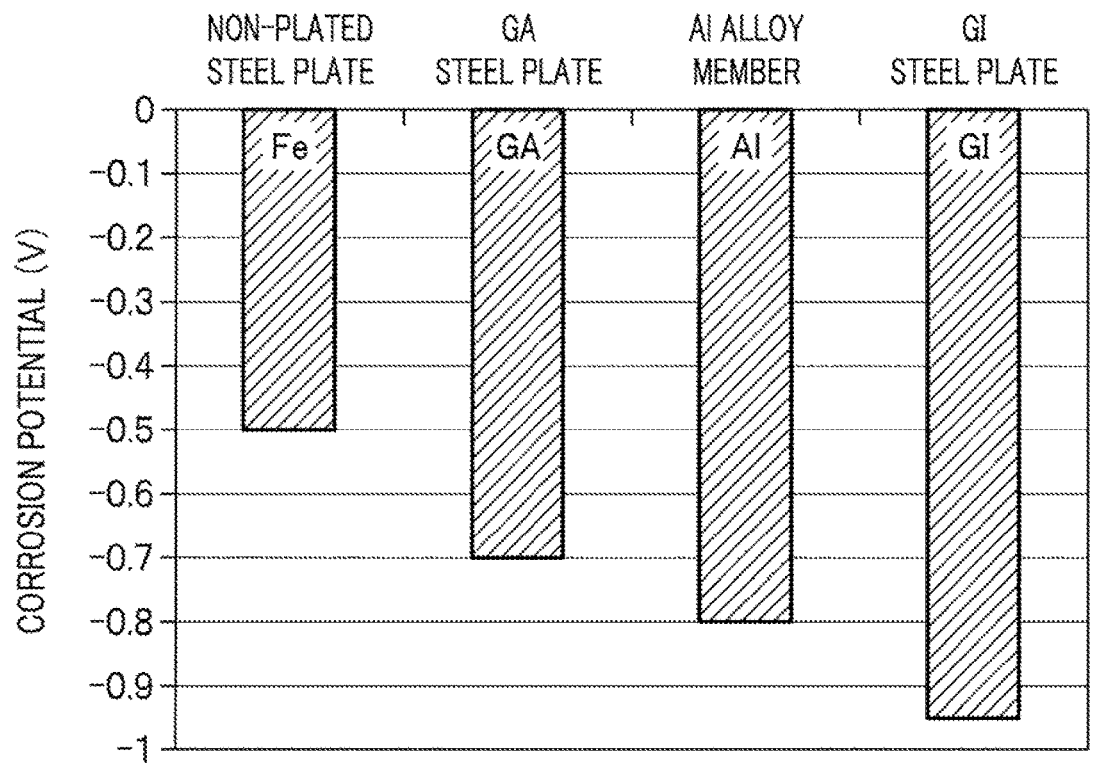
FIG. 5A is a graph illustrating a relationship between corrosion potentials of aluminum and the like, and FIG. 5B is an explanatory diagram illustrating a hardness and the like of a plating layer of a steel plate in a present embodiment (GI steel plate) and a comparative example (GA steel plate)

FIG. 5A is a graph illustrating a relationship between corrosion potentials of aluminum and the like. Note that in FIG. 5A, "Fe" represents iron, "GA" represents galvannealed steel plate, "Al" represents an aluminum alloy member, and "GI" represents hot-dip galvanized steel plate.

In the present embodiment, a hot-dip galvanized steel plate (GI steel plate) is used as the rear cross panel 24. On the other hand, as compared with the case of using, for example, a galvannealed steel plate (GA steel plate) as the rear cross panel 24, the corrosion potential changes in terms of aluminum in the present embodiment, and corrosion progression for aluminum can be prevented.

In addition, in the present embodiment, use of a hot-dip galvanized steel plate (GI steel plate) as the rear cross panel 24 makes it possible to exhibit a sacrificial anticorrosive effect for the aluminum alloy member. Note that when a galvannealed steel plate (GA steel plate) is used as the rear cross panel 24, it is impossible to obtain the sacrificial anticorrosive effect for the aluminum alloy member. This "sacrificial anticorrosive effect" is an action in which even when, for example, a scratch occurs in the zinc plating layer and the base iron is exposed, the corrosion of iron is prevented because the zinc surrounding the scratch dissolves prior to the iron to electrochemically protect the iron.

Moreover, consider the case where the sealing material 70 interposed between the rear cross member 22 and the rear cross panel 24 deteriorates and ingress (penetration) of water and electrolyte occurs. When corrosion takes place in the rear cross member 22 which is an aluminum alloy member, aluminum oxide is generated ($Al+O \rightarrow Al_2O_3$). The volume expansion due to this oxidation of aluminum causes a peeling force to peel off the rear cross member 22 on the upper side and the rear cross panel 24 on the lower side. In the present embodiment, it is possible to prevent this peeling force by using a hot-dip galvanized steel plate (GI steel plate) as the rear cross panel 24.

Figure 6B:
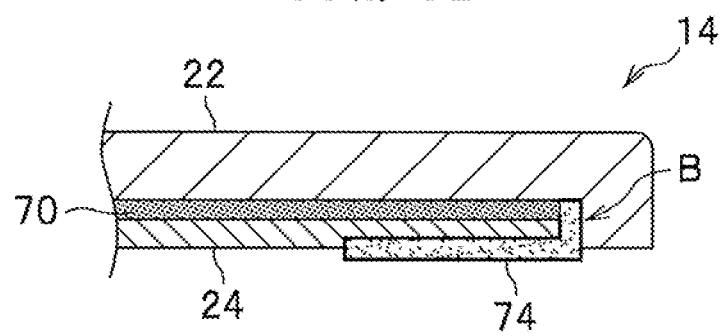
FIG. 6B is a cross-sectional view of the comparative example not provided with the protruding portion.

FIG. 6A is a cross-sectional view of the present embodiment provided with a protruding portion at a side end portion of a rear cross panel, and FIG. 6B is a cross-sectional view of the comparative example not provided with the protruding portion.

In the present embodiment, as illustrated in FIG. 6A, the protruding portions 64 are provided on both side end portions in the vehicle width direction of the rear cross panel 24. The protruding portions 64 have a substantially L-shaped cross section and extend outward from both side end portions 22a in the vehicle width direction of the rear cross member 22. By providing the protruding portions 64, it is possible to prevent, for example, the progress of corrosion to the friction stir welding portion. Consider the case where the protruding portions 64 are not provided as illustrated in the comparative example of FIG. 6B. The corroded portion 74 generated on the bottom surface side of the rear cross panel 24 enters the joining interface between the rear cross member 22 and the rear cross panel 24 (see arrow B in FIG. 6B). As a consequence, progression of corrosion to the friction stir welding portion becomes faster.

In the present embodiment, use of a high strength iron member for the frame front parts 12 makes it possible to reduce the thickness and the weight of the side members. To be more specific, light-weight side members can be achieved which can appropriately control the load transmission to the frame rear part 14 by receiving a predetermined collision load. In addition, in order to control this collision load, the frame rear part 14 may have such a structure that the joining portion between the rear cross member 22 and the rear cross panel 24 is not peeled and separated by friction stir welding.

Also, in the present embodiment, the strength of the iron member of the subframe structure 10 is partially changed. To be more specific, in the structure of the frame rear part 14 to be friction stir welded, regarding the required characteristic for the rear cross panel 24, the member rigidity is more important than the member strength. In the present embodiment, from the viewpoint of weight reduction and low cost, the requirement of enhancing the strength of the iron member of the frame rear part 14 is weaker than that of the frame front parts 12. For this reason, it is possible to use a low strength soft steel plate as the iron member of the frame rear part 14. Since the soft steel plate has low strength, it is possible to reduce the load on the joining tool 62 (joining pin 66).

Figure 8:
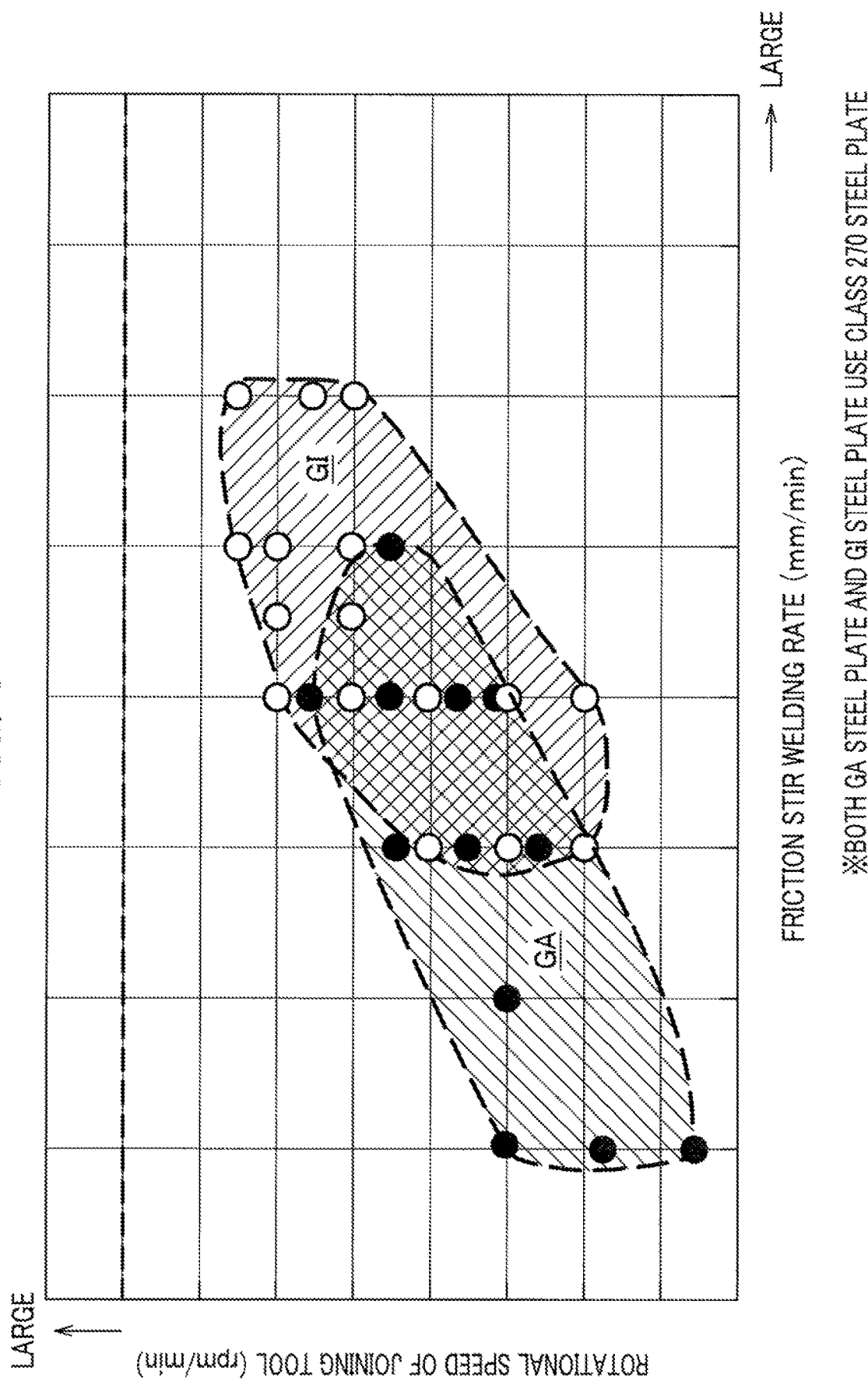
FIG. 8 is a characteristic diagram illustrating a relationship between a friction stir welding rate and a rotational speed of the joining tool.

FIG. 8 is a characteristic diagram illustrating a relationship between a friction stir welding rate and a rotational speed of the joining tool.

In FIG. 8, "○" represents the present embodiment where friction stir welding was carried out using a hot-dip galvanized steel plate (GI steel plate) as the rear cross panel 24, and "●" represents the comparative example where friction stir welding was carried out using a galvannealed steel plate (GA steel plate) as the rear cross panel 24. Note that in any of the present embodiment and the comparative example, the friction stir welded frame rear part 14 has desired joining strength and desired quality. Additionally, both the GI steel plate and the GA steel plate use a class 270 steel plate (JIC 270 and JAC 270).

As can be appreciated from FIG. 8, use of a hot-dip galvanized steel plate (GI steel plate) shifts the position of the area of the present embodiment, to which multiple "○"

belong, to the right in the figure with respect to the area of the comparative example, to which multiple "●" belong. As a result, the present embodiment using a hot-dip galvanized steel plate (GI steel plate) can improve the friction stir welding rate compared with comparative example using a galvannealed steel plate (GA steel plate).

In addition, FIG. 5B is an explanatory diagram illustrating a hardness and the like of a plating layer electrodeposition-coated on a steel plate in the present embodiment (GI steel plate) and the comparative example (GA steel plate).

As illustrated in FIG. 5B, the galvannealed steel plate (GA steel plate) according to the comparative example has a hard alloy layer of iron and zinc in the plating layer at the temperature of friction stirring of aluminum (400 to 500° C.) (see Alloy Form and Hardness in FIG. 5B). This is an impediment to the friction stir welding between the aluminum alloy member and the steel plate. On the other hand, the plating layer of the hot-dip galvanized steel plate (GI steel plate) according to the present embodiment is softer than the GA steel plate and reaches almost the melting point at the temperature of friction stirring (400 to 500° C.). For those reasons, the hot-dip galvanized steel plate (GI steel plate) according to the present embodiment is not an impediment to the friction stir welding and can improve the jointability between the aluminum alloy member and the steel plate. As a consequence, in the present embodiment, it is possible to improve the jointability between the aluminum alloy member and the steel plate by changing the surface treatment of the steel plate.

Furthermore, in the present embodiment, the pair of the upper side member 18 and the lower side member 20 forming each frame front part 12 are formed of a galvannealed steel plate (GA steel plate), and the rear cross panel 24 forming the frame rear part 14 is formed of a hot-dip galvanized steel plate (GI steel plate). The rear cross member 22 of an aluminum alloy die casting and the rear cross panel 24 of the hot-dip galvanized steel plate (GI steel plate) are integrally joined by friction stir welding. This makes it possible to achieve a higher friction stir welding rate in the present embodiment. As a consequence, it is possible to achieve shortening of the working time and reduction of the manufacturing cost.

Moreover, in the present embodiment, it is possible to reduce the defective joint rate by friction stir welding using a hot-dip galvanized steel plate (GI steel plate) compared with the case of friction stir welding using a galvannealed steel plate (GA steel plate). As a consequence, the present embodiment makes it possible to improve the yield of the not-illustrated subframe, a complete product.

Still further, in the present embodiment, it is possible to improve the corrosion resistance reliability of the non-joined gap near the friction stir welding portions 74 by friction stir welding using a hot-dip galvanized steel plate (GI steel plate) compared with the case of friction stir welding using a galvannealed steel plate (GA steel plate).

What is more, in the present embodiment, the side end portion in the vehicle width direction of the rear cross panel 24 (GI steel plate) forming the frame rear part 14 is provided with the protruding portion 64 having a substantially L-shaped cross section (see FIG. 6A). When this protruding portion 64 is provided, it is possible to prevent spreading of the corroded portion 74 to the sealing material 70 interposed between the rear cross member 22 and the rear cross panel 24. Further, if the protruding portion 64 has a substantially L-shaped cross section, it is possible to easily manufacture the protruding portion 64 by, for example, bending processing or the like.

Figure 7A:
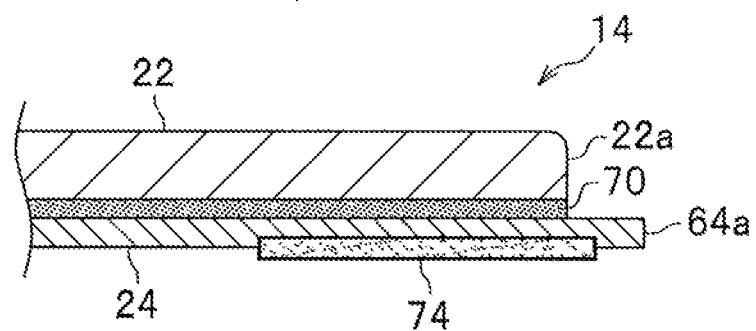
FIG. 7A and FIG. 7B are each a cross-sectional view illustrating a modified example of the protruding portion depicted in FIG. 6.
Figure 7B:
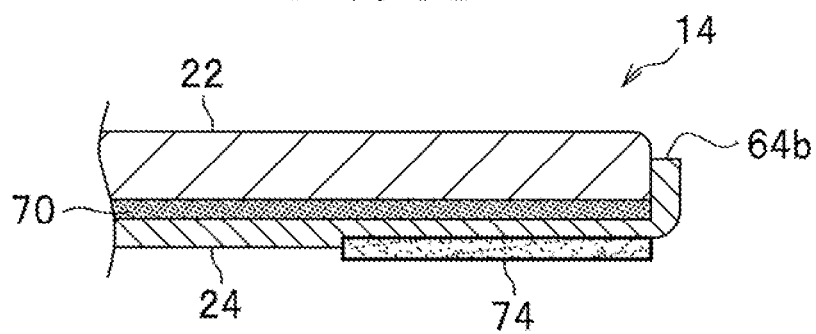

FIG. 7A and FIG. 7B illustrates modified examples of this protruding portion 64.

A protruding portion 64a according to the first modified example illustrated in FIG. 7A has such a characteristic that the side end of the rear cross panel 24 is allowed to protrude from the side end 22a of the rear cross member 22 outward in the extension direction thereof.

A protruding portion 64b according to the second modified example illustrated in FIG. 7B has such a characteristic that it is bent toward the rear cross member 22, opposite to the protruding portion 64 of FIG. 6A. Note that since the protruding portions 64a and 64b according to the modified examples have the same operations and effects as the protruding portion 64 illustrated in FIG. 6A, a detailed description thereof will be omitted.

In the present embodiment, each frame front part 12 is formed by combining the upper side member 18 and the lower side member 20 each formed of an electrodeposition-coated galvannealed steel plate (GA steel plate). On the other hand, the frame rear part 14 is formed by integrally joining, by friction stir welding, the rear cross panel 24 formed of an electrodeposition-coated hot-dip galvanized steel plate (GI steel plate) and the rear cross member 22 of an aluminum alloy die casting.

As described above, the present embodiment makes it possible to achieve a reduced weight and a high strength characteristic, a faster friction stir welding rate, and the improvement of corrosion resistance reliability.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A different materials joint structure comprising:
different materials of an iron member and an aluminum member integrally joined together by a friction stir welding;
wherein the different materials joint structure is a subframe mounted on a vehicle,
wherein the subframe comprises a frame front part and a frame rear part in a vehicle front-rear direction,
wherein the frame front part and the frame rear part are joined together,
wherein the frame front part has a higher strength than the frame rear part,
wherein surface treatment of the iron member differs between the frame front part and the frame rear part,
wherein the iron member forming the frame front part is made of a galvannealed steel plate (GA steel plate),
wherein the iron member forming the frame rear part is made of a hot-dip galvanized steel plate (GI steel plate), and
wherein the hot-dip galvanized steel plate (GI steel plate) forming the frame rear part and the aluminum member are joined together by a friction stir welding.

2. The different materials joint structure according to claim 1,
wherein the hot-dip galvanized steel plate (GI steel plate) forming the frame rear part includes an end in a vehicle width direction,
wherein the end in the vehicle width direction includes an protruding portion, and wherein the protruding portion extends over an end, in the vehicle-width direction, of the aluminum member forming the frame rear part.

3. The different materials joint structure according to claim 1,
wherein the frame front part includes a combination of iron members made of the galvannealed steel plate (GA steel plate), and
wherein the frame rear part includes the iron member of the hot-dip galvanized steel plate (GI steel plate) and the aluminum member integrally joined together by a friction stir welding.

* * * * *